United States Patent [19]

Muntjanoff et al.

[11] 4,379,675
[45] Apr. 12, 1983

[54] DAMPENED FULLY PIVOTAL HANGER FOR A GRAPPLE

[75] Inventors: John R. Muntjanoff, Aurora; Dennis M. Day, Hinckley, both of Ill.

[73] Assignee: Caterpillar Tractor Co., Peoria, Ill.

[21] Appl. No.: 270,533

[22] PCT Filed: Dec. 4, 1980

[86] PCT No.: PCT/US80/01647
§ 371 Date: Dec. 4, 1980
§ 102(e) Date: Dec. 4, 1980

[51] Int. Cl.³ ............................................. B66C 1/00
[52] U.S. Cl. .............................. 414/734; 294/86 R; 414/735
[58] Field of Search ............... 414/729, 734, 735, 738, 414/739; 294/86 R, 106, 86.23; 188/1 B; 37/183 R; 212/146, 147, 86 R

[56] References Cited

U.S. PATENT DOCUMENTS

| | | | |
|---|---|---|---|
| 1,962,516 | 6/1934 | Mitchell | 214/138 |
| 3,493,135 | 2/1970 | Novotny | 414/735 |
| 3,525,547 | 8/1970 | Hiseler et al. | 294/106 |
| 3,534,995 | 10/1970 | Heikkinen | 294/86 R X |
| 3,592,503 | 7/1971 | Lundberg | 294/86 R |
| 3,895,694 | 7/1975 | Muntjanoff | 188/1 B X |
| 3,904,156 | 9/1975 | Smith | 212/146 X |
| 3,907,137 | 9/1975 | Korbel et al. | 214/147 R |
| 3,933,389 | 1/1976 | Korbel | 414/734 X |
| 3,937,302 | 2/1976 | Palmcrantz | 188/1 B |
| 3,945,137 | 3/1976 | Ruttershoff | 37/183 R |
| 3,946,882 | 3/1976 | Koch | 214/147 G |
| 4,099,762 | 7/1978 | Hultdin | 294/86 R X |
| 4,181,343 | 1/1980 | Lindqvist | 294/86 R |
| 4,273,242 | 6/1981 | Schaper | 212/147 |

FOREIGN PATENT DOCUMENTS

| | | | |
|---|---|---|---|
| 927324 | 5/1973 | Canada | 214/44 |
| 1271942 | 7/1968 | Fed. Rep. of Germany | 212/147 |

OTHER PUBLICATIONS

Taylor Machine Works Sales Literature EPN-85.
ESCO Corp. Sales Literature E71-183-8EPD SM dated Sep. 1979.

*Primary Examiner*—Robert J. Spar
*Assistant Examiner*—Terrance L. Siemens
*Attorney, Agent, or Firm*—Joseph W. Keen

[57] ABSTRACT

A dampened fully pivotal hanger (10) for a grapple (12) of a log skidding vehicle (14) or the like having a main mounting member (24) attachable to a rotator (22), first pivoting members (32) pivotal with respect to the main mounting member (24) and second pivoting members (48) pivotal with respect to the first pivoting members (32). A grapple assembly (12) is attached to the second pivoting members (48). A pair of shock absorbers (60,68) is connected between each pair of pivotally attached assemblies (24,32,48) for dampening motion therebetween. The elements of the present hanger (10) define a recess (71) through which hydraulic lines (72) are protectedly run. The dampened, fully pivotal hanger (10) prevents destructive swinging of the grapple assembly (12) when not loaded.

14 Claims, 3 Drawing Figures

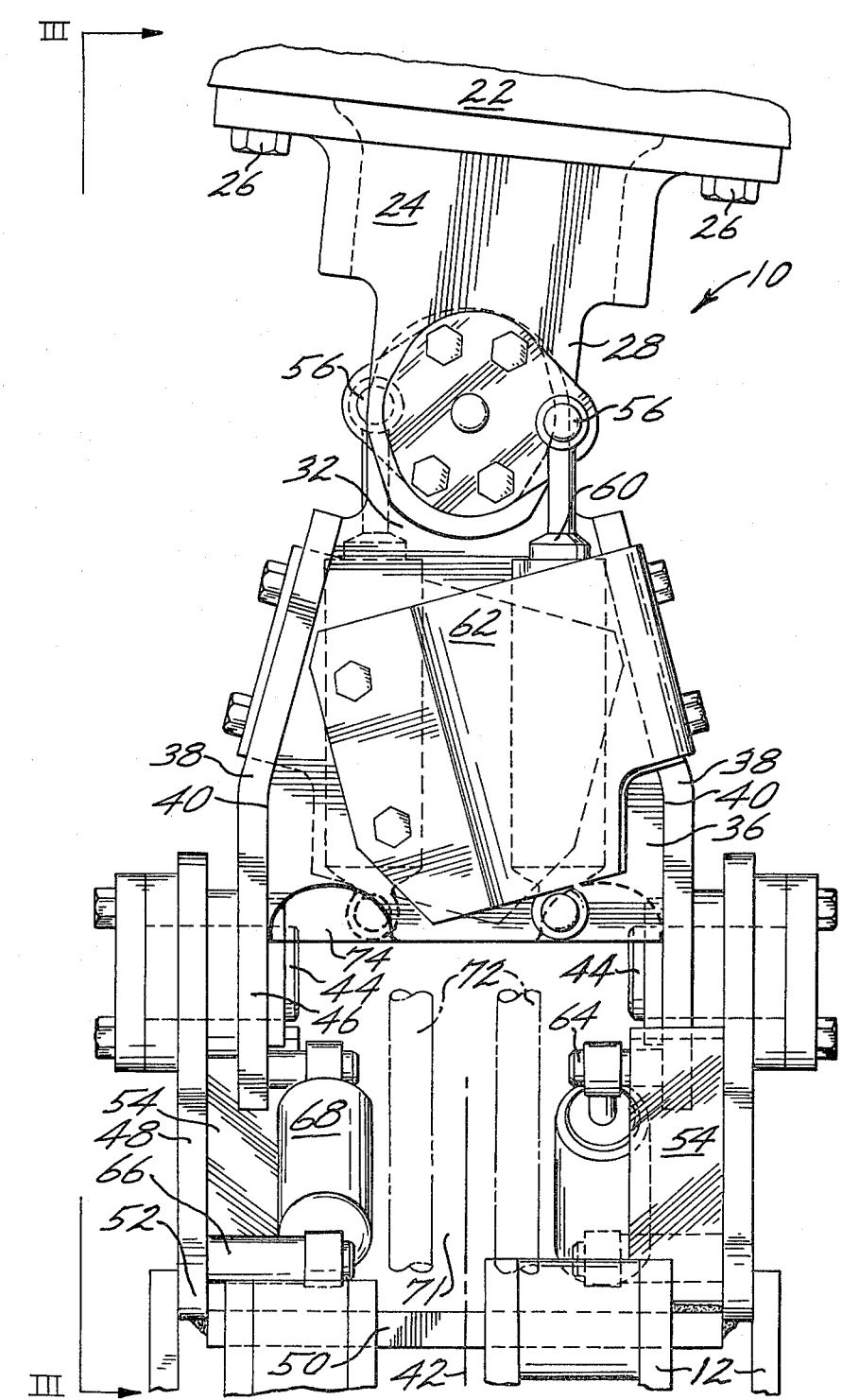

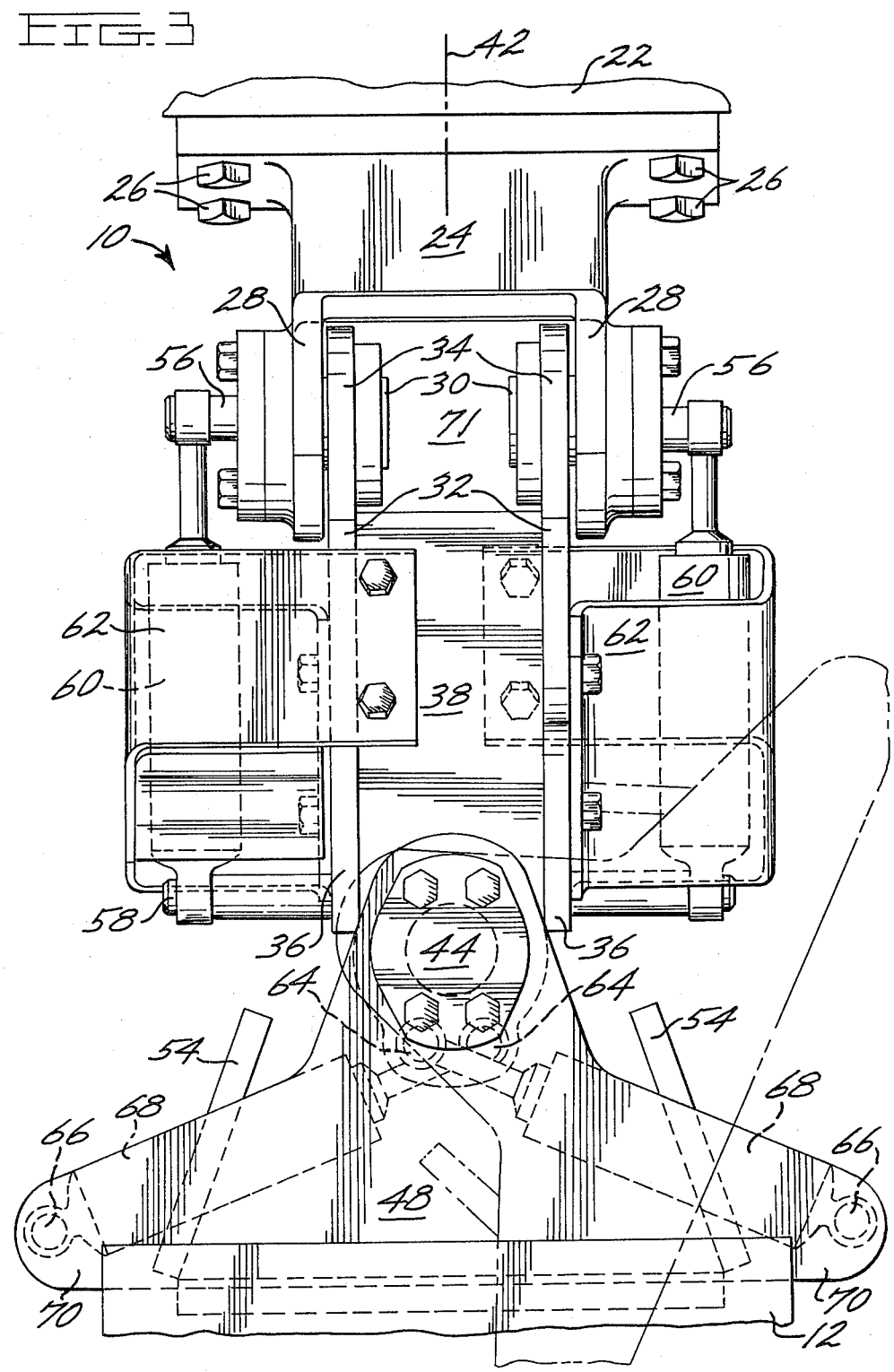

DAMPENED FULLY PIVOTAL HANGER FOR A GRAPPLE

DESCRIPTION

1. Technical Field

This application relates generally to grapples and more particularly to dampened grapple assemblies for log skidders.

2. Background Art

In certain classes of hauling operations, such as moving harvested trees from their felling point to a collection point, there is often no feasible way of transporting a load other than by dragging it behind a vehicle. This is typically accomplished by grasping the load with a grapple suspended from an elevated support boom borne by the vehicle. Basic examples of grapple assemblies suitable for use in skidding loads are set forth in U.S. Pat. No. 3,907,137 issued Sept. 23, 1975 to Korbel et al and in U.S. Pat. No. 3,946,882 issued Mar. 30, 1976 to Koch.

Typically, a log skidder will have a boom assembly with a grapple assembly depending from it. It is structurally advantageous to mount the grapple assembly so that it is pivotable about the boom assembly. Commonly, grapple assemblies are pivotable about two mutually perpendicular, horizontal axes.

Such pivotability is, however, to a certain degree disadvantageous. If not somehow restrained the pivotable grapple assembly is freely swingable. Such uncontrolled movement of the grapple assembly about its pivot points may under some circumstances be sufficiently severe as to permit the grapple to periodically contact rear portions of the vehicle, occasionally resulting in damage. Damage to the pivot mountings themselves can also be caused by loadings resulting from this unrestrained swinging. It would be highly advantageous if this swinging could simply, inexpensively and automatically be controlled.

Most commonly this difficulty is overcome by snubbing the grapple to the log skidder with a cable and winch assembly. Such an arrangement is detailed in U.S. Pat. No. 3,907,137, cited previously. This solution is, however, disadvantageous in that it is relatively expensive and produces an impediment to controlled grapple rotatability owing to the attached cable. This scheme also requires operator action to effect the snubbing, resulting in the possibility of this action not being taken due to forgetfulness or neglect.

Another manner of preventing free pivotability of the grapple is disclosed in U.S. Pat. No. 3,945,137 issued to Rultershoff on Mar. 23, 1976. This reference discloses a pivot assembly having pivot pins rotatable in elastomeric bushings for resisting rotation of the pivot pins. The force which the bushing applies to the pivot pin is manually adjustable for controlling the extent of dampening for the grapple depending from the pivot pin. This dampening device is disadvantageous in that wear of its components, particularly the bushing, necessitates frequent adjustment and/or replacement to maintain an adequate degree of dampening.

The present invention is directed to overcoming one or more of the problems set forth above.

DISCLOSURE OF THE INVENTION

A dampened pivoting hanger for grapples and the like is disclosed in the present application. A main mounting member fixably attachable to a rotator or some other supportive member has pivotally connected thereto and depending therefrom a first load bearing means. A first jack means is connected between said main mounting member and said first load bearing means for dampening the pivotability of said first means. A second load bearing means is pivotally connected to said first load bearing means.

The prime objects of the present invention include: the provision of a hanger for grapples and the like which is pivotable about two skew axes; the provision for grapples and the like of a hanger through which hydraulic lines may protectively be run; the provision of a pivotable hanger for grapples and the like which is dampened in a manner not requiring significant maintenance or adjustment; and, the provision of a dampened pivotable hanger for grapples and the like which is easily disconnected and mounted.

BRIEF DESCRIPTION OF THE DRAWINGS

FIG. 2 is an enlarged detailed diagrammatic side elevational view of area II indicated on FIG. 1; and FIG. 3 is a diagrammatic rear elevational view as viewed in the direction of the arrows on line III—III of FIG. 2.

BEST MODE FOR CARRYING OUT THE INVENTION

Figure 1:
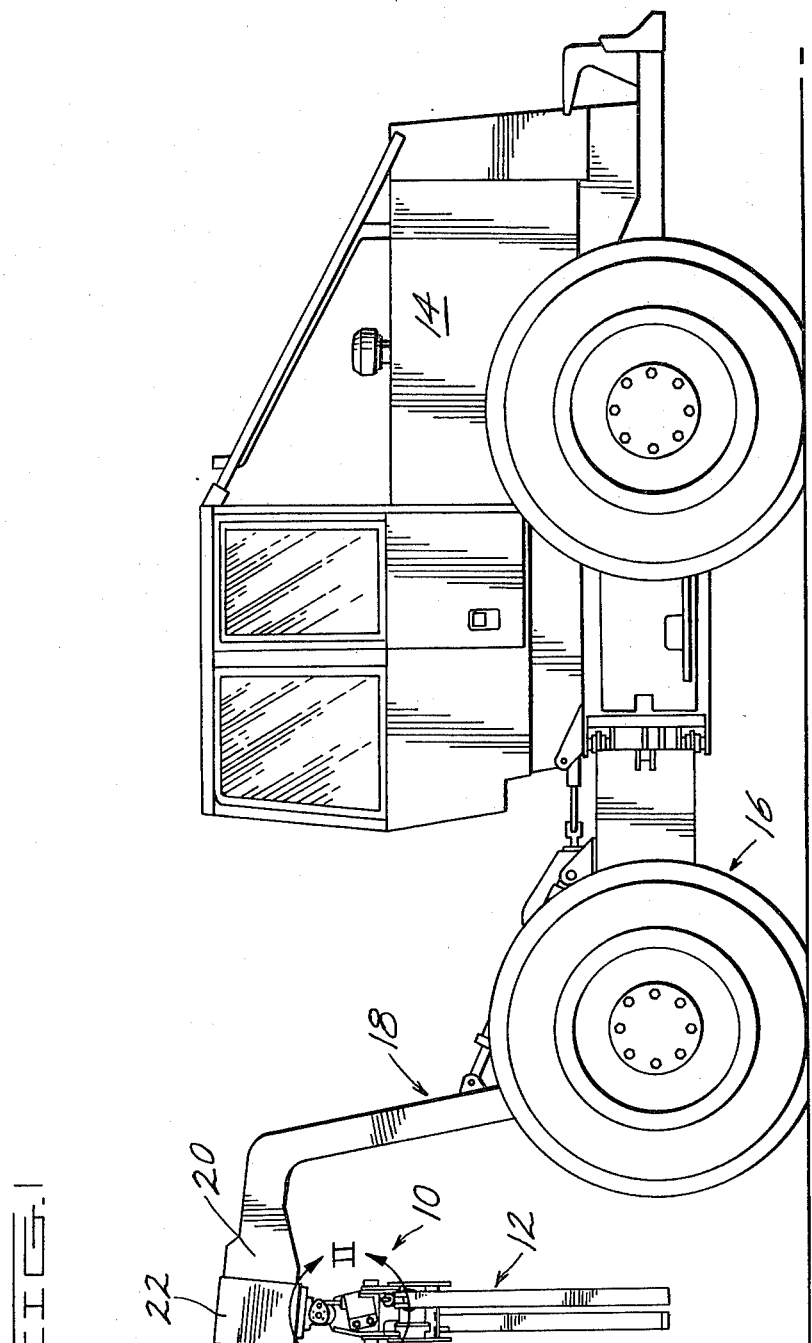
FIG. 1 is a diagrammatic side elevational view of a log skidding vehicle incorporating an embodiment of the present invention.

Referring more particularly to the drawings, a dampened fully pivotal hanger for a grapple, embodying the principles of the present invention, is generally indicated by the reference numeral 10. The dampened fully pivotal hanger 10 is preferably utilized for supporting a grapple assembly 12 of a log skidding vehicle 14.

The log skidding vehicle 14 has an aft portion 16 to which is mounted a boom assembly 18. Preferably a rotator 22 is attached to an aftmost position 20 on the boom assembly 18 for rotating the dampened pivoting hanger 10 and, hence, the grapple assembly 12 attached thereto.

As best shown in FIGS. 2 and 3 the dampened fully pivotal hanger 10 has a main mounting member 24 by which it is attached to the rotator 22, the attachment being made with bolts 26 or other means to permit simple removability. The main mounting member 24 has two substantially parallel spaced apart downwardly extending support portions 28. A stub pin 30 projects from each support portion 28, with the stub pins 30 extending one toward the other in axially aligned spaced apart relation.

A first pivoting member 32 is pivotally mounted at an upper portion 34 thereof on each of the stub pins 30. These first pivoting members 32, as best shown in FIG. 2, consist of downwardly extending plates substantially identical one to the other and being in parallel spaced apart symetric relationship. Preferably these first pivoting members 32 generally increase in width as they extend downward reaching a region of constant width at lower portion 36 thereof.

A pair of crossmembers 38 join the first pivoting members 32 one to the other. These crossmembers 38 are each connected between corresponding side edges 40 of the two first pivoting members 32. The crossmembers 38 follow the contour of the edge portions 40, extending outward and downward with respect to a vertical central axis 42 of the dampened fully pivotal hanger 10 until they reach the first pivoting member lower portion 36 whereafter they extend purely downward and are mutually parallel.

A pivot pin 44 extends through and projects outward from a lower portion 46 of each crossmember 38. These pivot pins 44 are axially aligned and rotatable about their axes in the crossmembers 38. A second pivoting member 48 is rigidly connected to each pivot pin 44 and is spaced from said central axis 42 a greater distance than the corresponding crossmember 38. These second pivoting members 48 are vertical plates which are mutually parallel and substantially perpendicular to the first pivoting members 32. Within its plane each second pivoting member 48 extends outward and downward from the pivot pin 44. A strengthening plate 50 is welded between bottom portions 52 of the two second pivoting members 48 to rigidly join them together. A stop member 54 extends upward from each second pivoting member 48 to prevent the second pivoting members 48 from pivoting more than a preselected amount, preferably about 60 degrees, in either direction. Pivoting of the second members 48 more than about 60 degrees is resisted by the stop member 54 coming into rigid contact with the first member 32 as shown in phantom outline in FIG. 3.

This embodiment of the present invention has several pairs of major elements separated one from the other by a spaced horizontal distance. For example, the two support portions 28 are a spaced horizontal distance apart as are the two first pivoting members 32, the crossmembers 38 and the second pivoting members 48. This separation defines a central recess 71 through which may conveniently be run hydraulic lines 72 for operation of the grapple assembly 12.

As best shown in FIG. 2, a pair of first shock absorber pins 56 are rigidly connected to and project outwardly from each of the support portions 28, each being a spaced horizontal distance from the axis of the stub pins 30. The axes of the stub pins 30 and the first shock absorber pins 56 are parallel and coplanar. The axes of the stub pins 30 are between those of the first shock absorber pins 56. Corresponding to each first shock absorber pin 56 is a second shock absorber pin 58 connected to one of the first pivoting members 32 a spaced vertical distance below the first shock absorber pin 56. A dampening means such as first shock absorber 60 is connected between the corresponding first and second pairs of shock absorber pins 56,58. This shock absorber 60 is preferably a heavy duty fluid type shock absorber but could also be a spring-type shock absorber or any of a number of other well known heavy duty shock absorbers. A cover 62, connected to one of the crossmembers 38 and the adjacent first pivoting member 32, encloses and protects each first shock absorber 60.

Similarly, as shown in FIGS. 2 and 3, each pair of second pivoting members 48 and crossmembers 38 has a pair of third shock absorber pins 64 and fourth shock absorber pins 66 providing a connection therebetween for a second shock absorber 68 of similar and preferably identical construction to the first shock absorber 60. Cutouts 74 are provided in the lower portion 36 of each first pivoting member 32 to provide clearance for each second shock absorber 68 during pivoting of the second pivoting members 48. One of each pair of third shock absorber pins 64 is rigidly connected to and projects inwardly from each crossmember 38 at a position below the corresponding pivot pin 44. Each of the two fourth shock absorber pins 66 is connected to and projects inwardly from a second pivoting member outermost portion 70. The two fourth shock absorber pins are located on non-corresponding outermost portions 70 of the two second pivoting members 48.

The grapple assembly 12 is connected by welding or other means to the second pivoting members so as to depend therefrom.

Industrial Applicability

The incorporation into a log skidding vehicle of an embodiment of the present invention yields significant operational advantages. The specific embodiment described previously is especially advantageous.

The dampened fully pivotal hanger 10 provides pivotability to a dependent grapple assembly 12 about two mutually perpendicular horizontal axes. This facilitates log handling and hauling operations as is well known to those skilled in the art. Depending the dampened pivoting hanger 10 from the rotator 22 permits these axes of pivotability to be controllably positioned within a horizontal plane as the need therefor arises.

Under actual operating conditions the forces transmitted to the log skidding vehicle 14 from the load supported by the grapple assembly 12 often will not be perpendicular to an axis of pivotability. This will result in the inducement of a torque in one or more portions of the dampened fully pivotal hanger 10. The previously detailed embodiment of the present invention advantageously counters this torque with a minimum of deformation in that each pivoting assembly is composed of two substantially separated, rigidly joined torque countering elements; that is: the support portions 28, the first pivoting members 32, the crossmembers 38 and the second pivoting members 48. This separation of the torque countering elements from the axis about which the imposed torque will act (this axis being the central axis 42) provides an increased moment arm permitting the required counter-torque to be developed with the application of smaller forces in the relevant members. The benefits of this decreased deformation are obvious to those skilled in the art.

Separation of the several pairs of components of this embodiment of the present invention yields the additional advantage of providing the recess 71 along the central axis 42. Hydraulic lines 72 for control of the grapple assembly 12 can be run from the boom assembly 18 to the grapple assembly 12 through this recess 71. They are thereby enclosed by the several components of the present invention and hence are protected from chafing, crushing and other occurrences tending to rupture or otherwise decrease the life of the hydraulic lines 72.

Also highly advantageous is the use of shock absorber pairs 60,68 for automatically dampening free swinging of the fully pivotal hanger 10 when an unloaded log skidding vehicle 14 moves over rough ground. The use of two rather than one shock absorber decreases the loadings induced by the dampening imposed at any one point of the hanger 10; provides a greater total dampening than would a single larger shock absorber capable of being fitted within the space constraints of grapple assembly 12; provides redundancy should one shock absorber 60,68 fail or otherwise be inoperative; and provides a greater central recess 71 with a smaller imbalance of forces than would a single shock absorber, increasing the room available for the hydraulic lines 72.

The shock absorbers 60,68 resist changes in their length in a well known manner and hence serve to dampen pivoting motion of the various elements of the hanger 10. Each of these shock absorbers 60,68 is connected between two members pivotable with respect to one another. It is a well known principle of geometry that the distance between any two points on separate members will change as these members are pivoted with respect to one another, so long as neither point is on the axis of pivotability. Pivoting, for example, of the first members 32 about the main member 24 causes the distances between the pins 56,58,64,66 to which the shock absorbers 60,68 are connected to change. Viewing FIG. 2, the pivoting of the first members 32 to the left causes extension of the shock absorber 60 on the right and compression of the shock absorber 68 on the left. The shock absorbers 60,68 resist such extension or contraction resulting in dampening of the pivotal motion.

It will be noted that the shock absorbers 60,68 are fully protected by second pivoting members 48 and covers 62 from injurious contact with outside objects. However, as will readily be observed, access to these shock absorbers 60,68 is readily available for maintenance and replacement when necessary. Further advantageous is the use of identical shock absorbers. Not only is interchangeability enhanced, but the degree of dampening thereby remains constant irrespective of the orientation of the grapple assembly 12.

The described embodiment of the present invention maintains as small a vertical distance as is believed to be attainable in a self dampened fully pivotable high visibility hanger. The upper or first shock absorbers 60 are vertically mounted so as to promote operator visibility on either side of the dampened pivoting hanger 10. This vertical mounting of the upper shock absorbers 60 additionally serves to provide room for extensive pivoting of the second pivoting members 48 without resulting in contact between the upper and lower shock absorbers 60,68 as would happen were both shock absorber pairs 60,68 substantially horizontally mounted. The lower or second shock absorbers 68 are substantially horizontally mounted, thereby minimizing the vertical height of the dampened pivoting hanger 10. This horizontal mounting, while resulting in a wide assembly, does not substantially interfere with visibility in that the grapple assembly 12, which is nearly as wide, is attached only a few inches beneath the elevation to which the wide portion of the second pivoting member 48 extends. Thus the widest portion of the assembly consumes only a few vertical inches.

The described embodiment of the present invention has internally contained dampening providing simplicity of interchangeability of the grapple-hanger assembly. Removal requires only disconnection of the hydraulic lines 72 and unbolting the main mounting member 24 from the rotator 22.

Other aspects, objects, advantages and uses of the present invention can be obtained from a study of the drawings, the disclosure and the appended claims. It should be understood that the dampened pivoting hanger for a grapple can assume many other configurations without departing from the claims presented hereafter.

We claim:

1. A dampened pivotal hanger assembly (10) adapted to be fixed to a supportive structure (14), comprising:
    a main mounting member (24) attachable to the supportive structure (14), said main mounting member (24) having two support portions (28) a spaced distance apart;
    mounting means (30) attached to each support portion (28);
    a pair of first pivoting members (32), each of said first pivoting members (32) being connected to a corresponding one of said mounting means (30) and being pivotable with respect to said support portions (28);
    crossmember means (38) joining the first pivoting members (32) one to the other, said crossmember means (38) supporting two horizontally spaced pivot pins (44);
    a pair of second pivoting members (48), each of said second pivoting members (48) being attached to a corresponding one of said second pivot pins (44) and being pivotable with respect to said first pivoting members (32);
    first extendable-retractable dampening means (60) connected between said main mounting member (24) and at least one of said first pivoting members (32) for resisting pivoting of said first pivoting members (32); and
    second dampening means (68) connected between said crossmember means (38) and at least one of said second pivoting members (48) for dampening pivoting of the second pivoting members (48) relative to said crossmember means (38) wherein said main mounting member (24), said first pivoting members (32) and said second pivoting members (48) define a central, substantially vertically extending recess (71).

2. The dampened pivotal hanger assembly as set forth in claim 1 including stop means (54) for preventing pivoting of said second pivoting members (48) beyond a preselected amount.

3. The dampened pivotal hanger assembly (10) as set forth in claim 1 wherein said first dampening means (60) includes a first extendable-retractable shock absorber (60).

4. The dampened pivotal hanger assembly as set forth in claim 1 wherein said first and said second dampening means (60,68) include a pair of dampening cylinders.

5. The dampened pivotal hanger assembly (10), as set forth in claim 1, wherein said second pivoting members (48) are adapted for having a grapple (12) attached thereto.

6. The dampened pivotal hanger assembly (10), as set forth in claim 5, wherein said main mounting member (24), said first pivoting members (32), and said second pivoting members (48) define a central, substantially vertically extending recess (71).

7. The dampened pivotal hanger assembly (10), as set forth in claim 6, said recess (71) being adapted for receiving hydraulic lines (72) passing therethrough from said supportive structure (14) to said grapple (12), said grapple (12) being hydraulically operated.

8. A dampened pivoting hanger assembly (10) adapted to be fixed to a supportive structure (14), comprising:
    a main mounting member (24) adapted to be attached to the supportive structure (14);
    first load bearing means (32,38) pivotally connected to said main mounting member (24) and depending therefrom;
    first extendable and retractable dampening means (60) connected between said main mounting member (24) and said first load bearing means (32,38)

for dampening pivotal motion therebetween, said first dampening means (60) being extendable and retractable by loads exerted on said first load bearing means (32,38);

second load bearing means (48) pivotally connected to said first load bearing means (32,38) and depending therefrom, wherein said main mounting member (24), said first load bearing means (32,38) and said second load bearing means (48) define a central, substantially vertically extending recess (71); and second dampening means (68) connected between said first load bearing means (32,38) and said second load bearing means (48) for dampening the pivotability therebetween.

9. The dampened pivoting hanger assembly (10) as set forth in claim 8 wherein said second load bearing means (48) is adapted to support a load engaging assembly (12).

10. The dampened pivoting hanger assembly as set forth in claim 8 wherein said second dampening means (68) includes at least one cylinder-type shock absorber.

11. The dampened pivoting hanger assembly as set forth in claim 8 wherein said first dampening means (60) includes a pair of double dampening cylinders.

12. The dampened pivoting hanger assembly as set forth in claim 8 wherein said first load bearing means (32,38) is spaced a vertical distance above said second load bearing means (48).

13. The dampened pivoting hanger assembly (10) as set forth in claim 8, said recess (71) being adapted for receiving hydraulic lines (72) passing therethrough from said supportive structure (14) to said load engaging assembly (12), said load engaging assembly (12) being hydraulically operated.

14. The dampened pivoting hanger assembly as set forth in claim 13 wherein said first dampening means (60) includes two cylinder-type shock absorbers (60) and said second dampening means (68) includes two cylinder-type shock absorbers (68).

* * * * *